United States Patent [19]

Hood

[11] Patent Number: 4,559,205
[45] Date of Patent: Dec. 17, 1985

[54] CATALYTIC CONVERTER SUBSTRATE AND RETAINER ASSEMBLY

[75] Inventor: Paul F. Hood, Clarkston, Mich.

[73] Assignee: General Motors Corporation, Detroit, Mich.

[21] Appl. No.: 470,159

[22] Filed: Feb. 28, 1983

[51] Int. Cl.⁴ ............................................. B01J 35/04
[52] U.S. Cl. ........................................ 422/180; 502/87
[58] Field of Search ................... 422/177, 180; 165/10; 29/451; 422/179; 502/87

[56] References Cited

U.S. PATENT DOCUMENTS

| | | | |
|---|---|---|---|
| Re. 30,629 | 6/1981 | Dawson | 60/682 |
| 3,088,271 | 5/1963 | Smith | 422/177 |
| 3,227,659 | 1/1966 | Brandenburg et al. | 422/177 |
| 3,785,781 | 1/1974 | Hervert et al. | 422/180 |
| 3,787,944 | 1/1974 | Mittman | 29/451 |
| 3,830,286 | 8/1974 | Clarke | 165/10 |
| 3,854,888 | 12/1974 | Frietzsche et al. | 422/180 |
| 3,996,997 | 12/1976 | Regan et al. | 165/10 |
| 4,078,898 | 3/1978 | Fedor et al. | 422/180 |
| 4,182,120 | 1/1980 | Niebylski | 422/180 |
| 4,186,172 | 1/1980 | Scholz | 422/180 |
| 4,318,888 | 3/1982 | Chapman | 422/180 |
| 4,335,078 | 6/1982 | Ushijima et al. | 422/180 |
| 4,362,700 | 12/1982 | Hayashi et al. | 422/180 |

FOREIGN PATENT DOCUMENTS 2302746 7/1974 Fed. Rep. of Germany .

Primary Examiner—David L. Lacey
Attorney, Agent, or Firm—R. L. Phillips

[57] ABSTRACT

There is disclosed a catalytic converter substrate of curved cross-sectional profile comprising a stack of modules individually formed of folded metal foil having contacting layers defining passages therebetween. The modules have a uniform thickness but various widths so as to conform the stack to the desired profile but with the combined thickness of the modules being made oversize such that the contacting layers are frictionally held together against relative sliding when the modules are compressively loaded by a retainer to completely conform to the desired profile.

2 Claims, 11 Drawing Figures

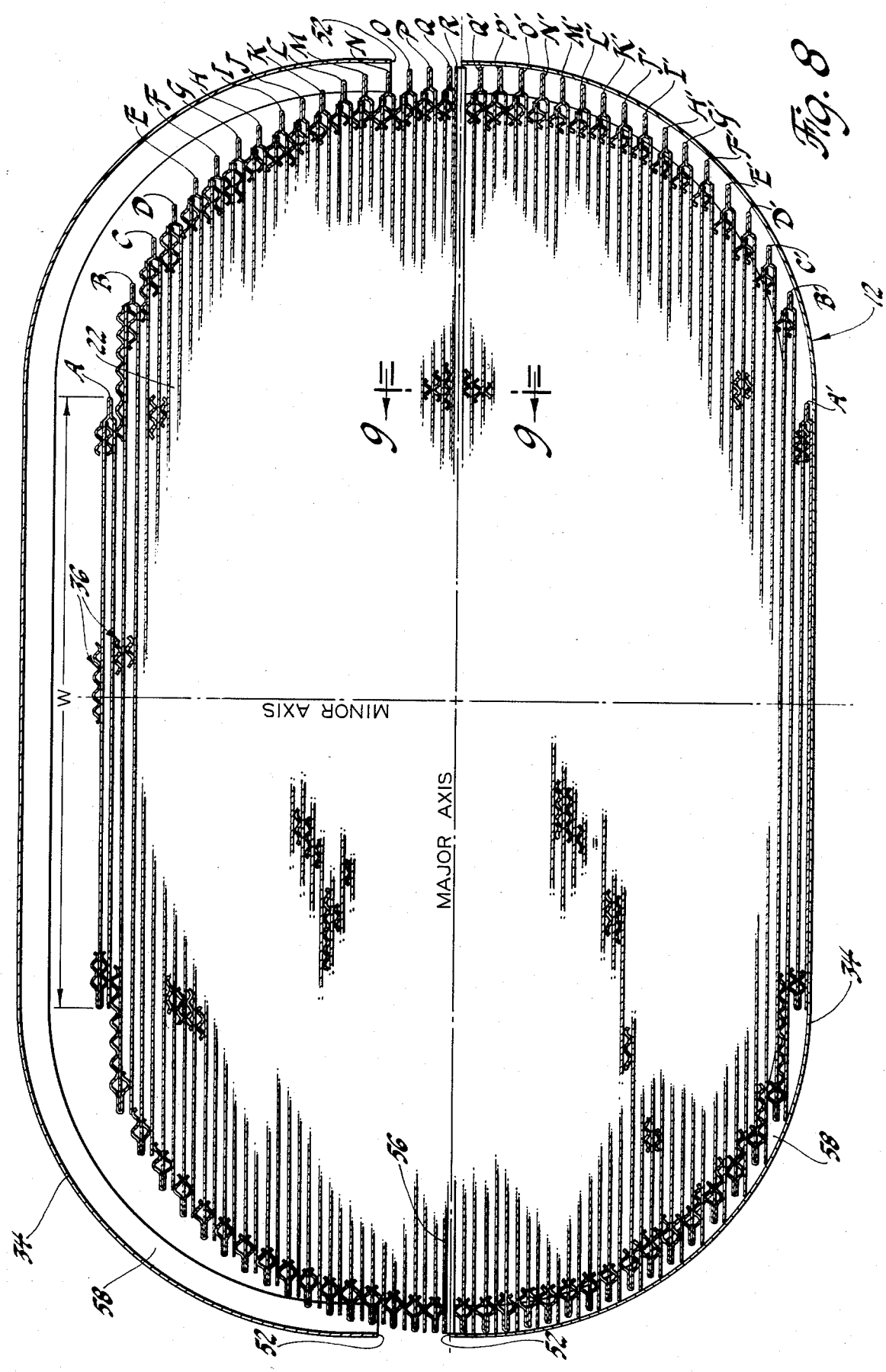

CATALYTIC CONVERTER SUBSTRATE AND RETAINER ASSEMBLY

This invention relates to catalytic converters and more particularly to those with a catalyst coated metal substrate of curved cross-sectional profile.

In the manufacture of catalytic converters used to eliminate the undesirable constituents in combustion engine exhaust gases, it is currently common practice as an alternative to bedded ceramic beads to employ a ceramic monolith or substrate that is coated with a catalyst and contained in a sheet metal housing through which the exhaust gases are directed. The ceramic is both frangible and has a much lower coefficient of expansion than the sheet metal forming the housing and as a result, an arrangement is required that will both support and maintain sealed integrity of the ceramic monolith without fracture thereof in the harsh vibratory and temperature environment of the engine exhaust system. Moreover, the ceramic monolith is normally formed by extrusion through a die and as a result a new die is required for every cross-sectional change.

Metal foil honeycomb substrates have been proposed in avoidance of such problems; however, they are typically deficient in some respect and/or present their own problems from a manufacturing and/or functional standpoint. For example, it is known to form the honeycomb substrate by spirally winding strips of smooth and corrugated metal foil but there results the problem of relative telescoping or sliding between the layers which abrades the catalyst. With such an arrangement, it is difficult to maintain the integrity of the metal substrate without some form of mechanical strengthening or bonding of the layers. Then there remains another major problem of allowing design flexibility in the shape of the metal layered substrate cross-section to meet various space allocations while maintaining a curved profile for housing strength reasons. This is particularly important in meeting certain vehicle underflow space requirements where a low profile cross-section of for example oval shape is desired over a circular one which requires a larger height for the same area. Moreover, there is the difficulty and expense of manufacture in completely forming a metal layered substrate so as to be suitable for a final step of applying the catalyst coating. For example, a wisker-covered metal foil has been developed that is ideally suited to retain a catalyst coating as disclosed in U.S. Pat. Nos. 4,312,828 and 4,331,631 assigned to the assignee of the present invention. However, the wiskers on such foil are metal oxide growths and as a result, form both a metallurgical and mechanical barrier preventing intimate contact between the base metal of adjacent layers of the foil and thereby their strong fusion welding which is normally necessary to form a suitable honeycomb substrate for the catalyst.

The present invention solves such problems and is a substantial departure from the conventional method of winding foil to form the substrate. According to the present invention, the substrate is constructed with a stack of modules individually formed of folded metal foil having contacting layers defining passages therebetween. In one embodiment, the modules are individually formed of folded and interleaved sheets of smooth and corrugated foil. The sheets have a single fold permitting their interleaving in a manner so that the halves of the corrugated sheet are arranged to alternate with the halves of the smooth sheet to form a row of passages between the adjacent foil layers. In another embodiment, the modules are simply individually formed of a single corrugated sheet that has a zigzag or herringbone pattern of corrugations and is folded directly on itself a certain number of times to obtain the desired rows of passages.

The substrate modules are provided with a uniform thickness and length but various widths so as to be stackable on each other and conformable to the curved cross-sectional outline or profile of the desired substrate cross-section. As such, their assembly is ideally suited for high speed production using simple shuttle type equipment. A sheet metal retainer comprising a pair of identical shells is provided for the stacked modules and conjointly exactly conform about their interior to the desired substrate cross-section profile whereas the free stack height of the modules is made oversize. A substantial compressive load is thus applied to the modules crosswise thereof by clamping action of the retainer shells when they are forced together and affixed along abutting longitudinal edges by welding. With such joining of the retainer shells, the stacked modules are thereafter frictionally held together with the thus retained compressive load which is determined so as to prevent relative sliding movement of the substrate foil layers under the harshest conditions expected to be experienced in the exhaust system environment. Moreover, the retainer shells are provided with an inwardly projecting flange at their opposite ends which extends over the corners of the stacked modules to positively prevent any longitudinal movement between the substrate foil layers and the retainer. Thus, it will be appreciated that the above novel arrangement permits use of the aforementioned wisker-covered foil without requiring welding together of the foil layers and the resulting containerized preloaded wisker-covered metal substrate need only be coated with a suitable catalyst as a final step before being mounted in a suitable converter housing or otherwise adapted for use.

Thse and other objects, advantages and features of the present invention will become more apparent from the following description and drawing in which:

FIG. 8 is an enlarged cross-sectional view showing the assembly of the substrate modules in FIG. 5 in the retainer of FIG. 4 with the top shell of the latter exploded.

Figure 1:
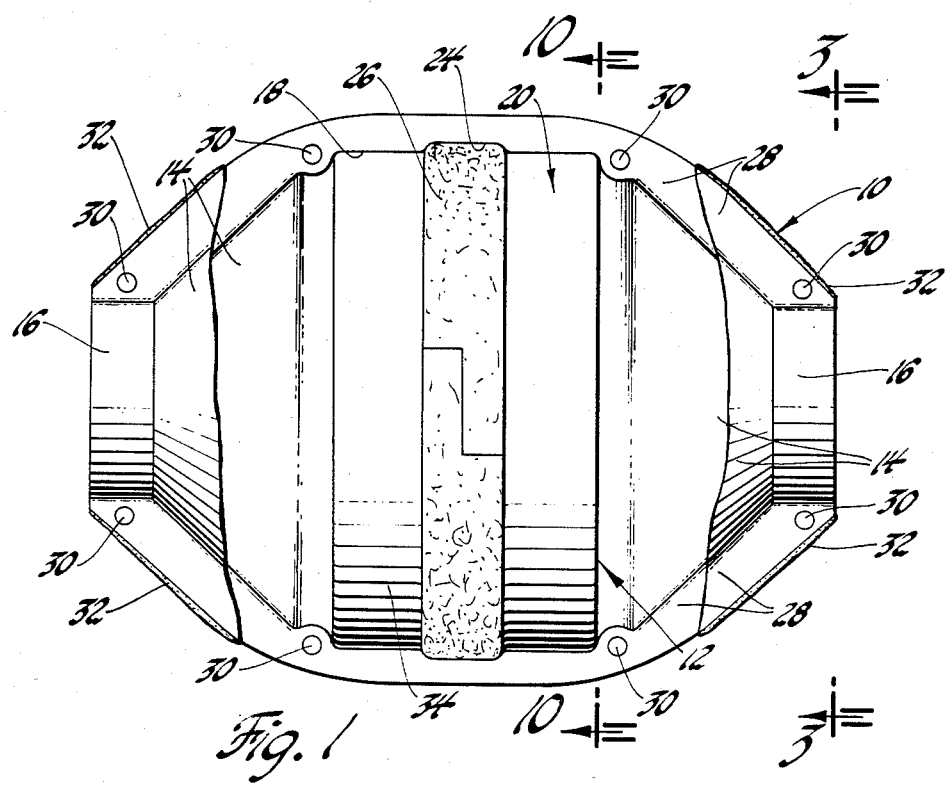
FIG. 1 is a plan view with parts broken away of a catalytic converter constructed according to the present invention.

Referring to the drawings, there is shown a catalytic converter constructed according to the present invention and intended for use in eliminating the undesirable constituents in internal combustion engine exhaust gases. The catalytic converter is particularly adapted with a low profile cross-section of oval shape for installation in an automobile exhaust system and generally comprises a housing 10 enclosing a retainer and monolith assembly 12 as best seen in FIGS. 1-3, 10 and 11. The housing 10 comprises a pair of identical sheet metal shells 14 having semi-cylindrical end sections 16 and an intermediately located semi-oval section 18. The housing shells' semi-oval sections 18 conjointly conform to the periphery of the monolith retainer 20 of assembly 12 so as to receive same in direct contact while the semi-cylindrical end sections 16 cooperate to define cylindrical inlet and outlet openings at opposite ends of the monolith 22 of assembly 12 adapting the converter for connection in an engine's exhaustpipe system (not shown). In addition, the housing shells 14 are formed midway of their oval section 18 with an internal semi-annular groove 24 which is adapted to receive a split ring seal 26 extending about the middle of the monolith retainer. The seal 26 is made of resilient heat expandable intumescent material such as that supplied under the tradename Interam by Technical Ceramics Products Division, 3M Company. The housing shells 14 are formed along their edge on each side with an outwardly projecting flange 28 extending from one end to the other so that when the housing shells are forced together about the retainer and monolith assembly 12 these flanges mate and then may be sealingly secured to complete the converter assembly. For purposes of processing, the mating flanges 28 are initially held together by a plurality of spot welds 30 whereafter they are permanently fixed and sealed along their entire length by an edge weld 32.

Figure 2:
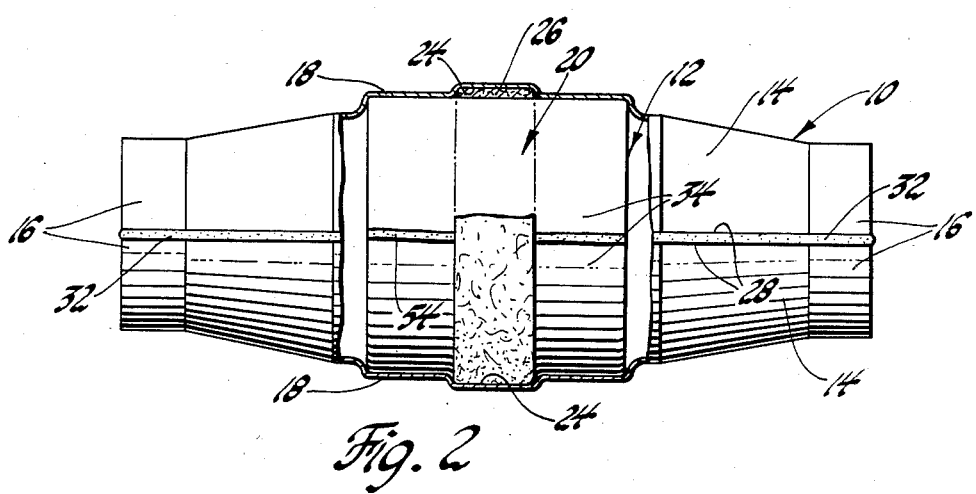
FIG. 2 is a side elevation but with parts broken away of the converter in FIG. 1.
Figure 3:
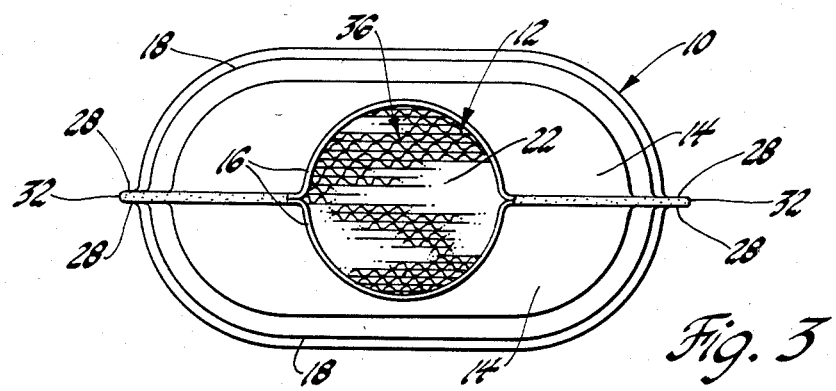
FIG. 3 is an end elevation taken along the line 3—3 in FIG. 1.
Figure 4:
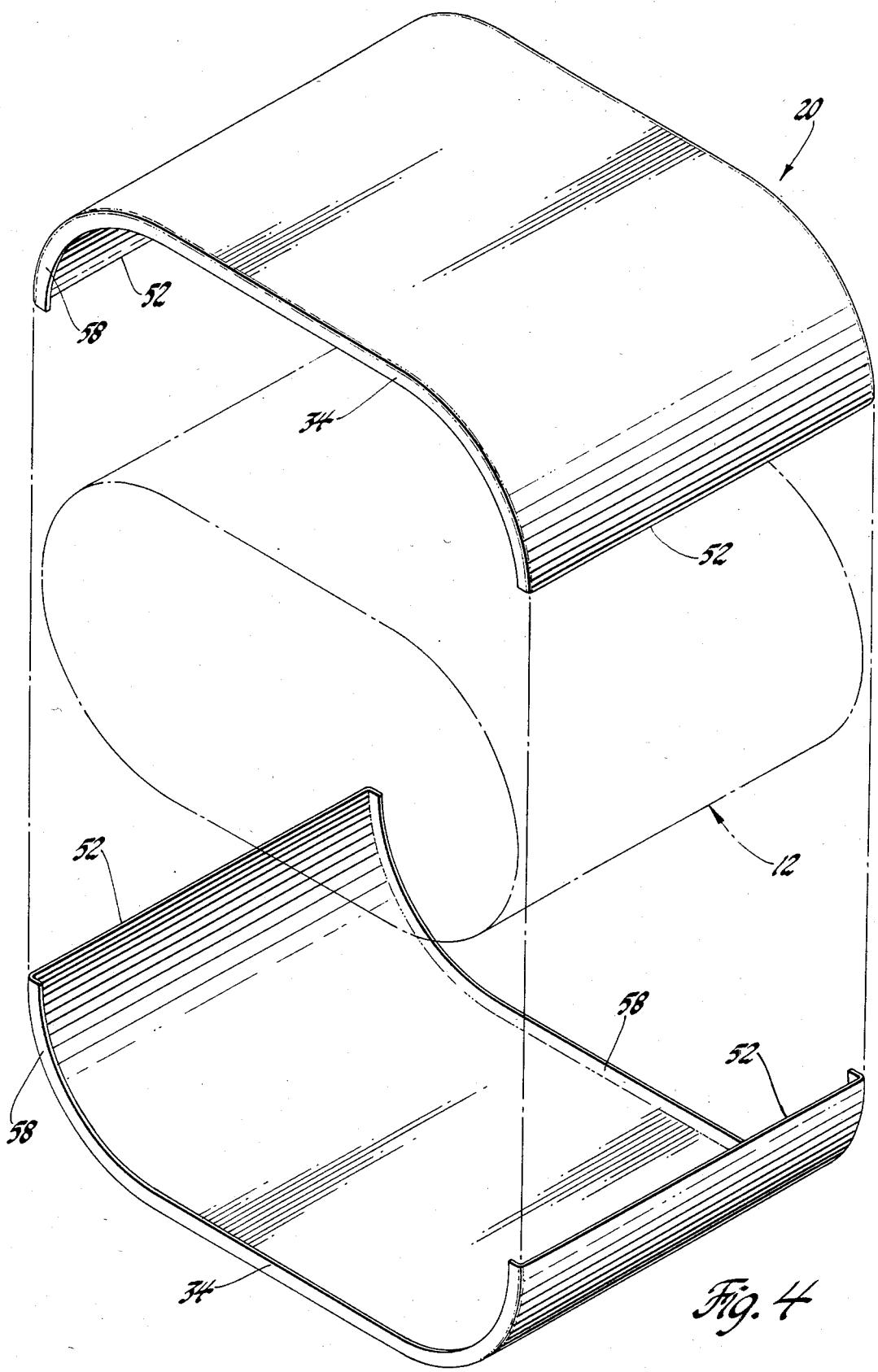
FIG. 4 is an exploded perspective view of the retainer in the converter in FIG. 1.
Figure 5:
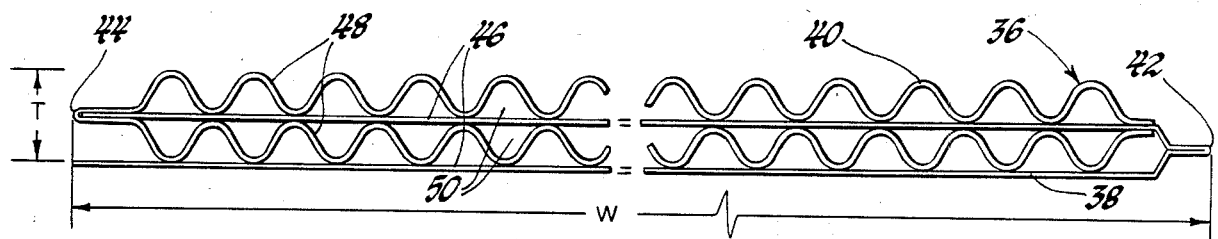
FIG. 5 is an enlarged end view of one embodiment of the modules forming the substrate in the converter in FIG. 1.
Figure 6:
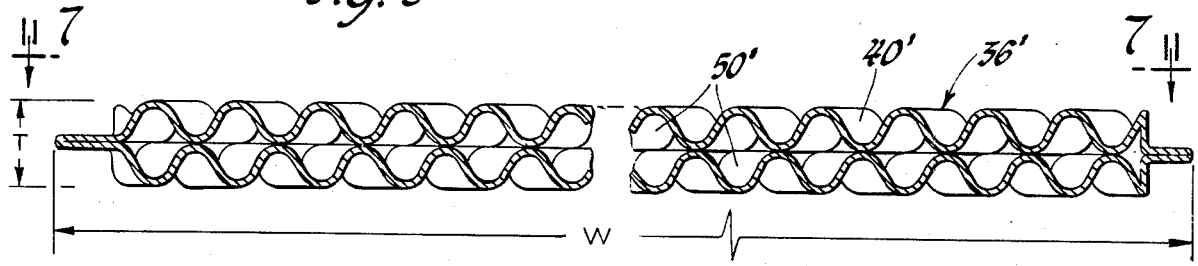
FIG. 6 is an enlarged end view of another embodiment of the modules which may be used to form the substrate in the converter in FIG. 1.
Figure 7:
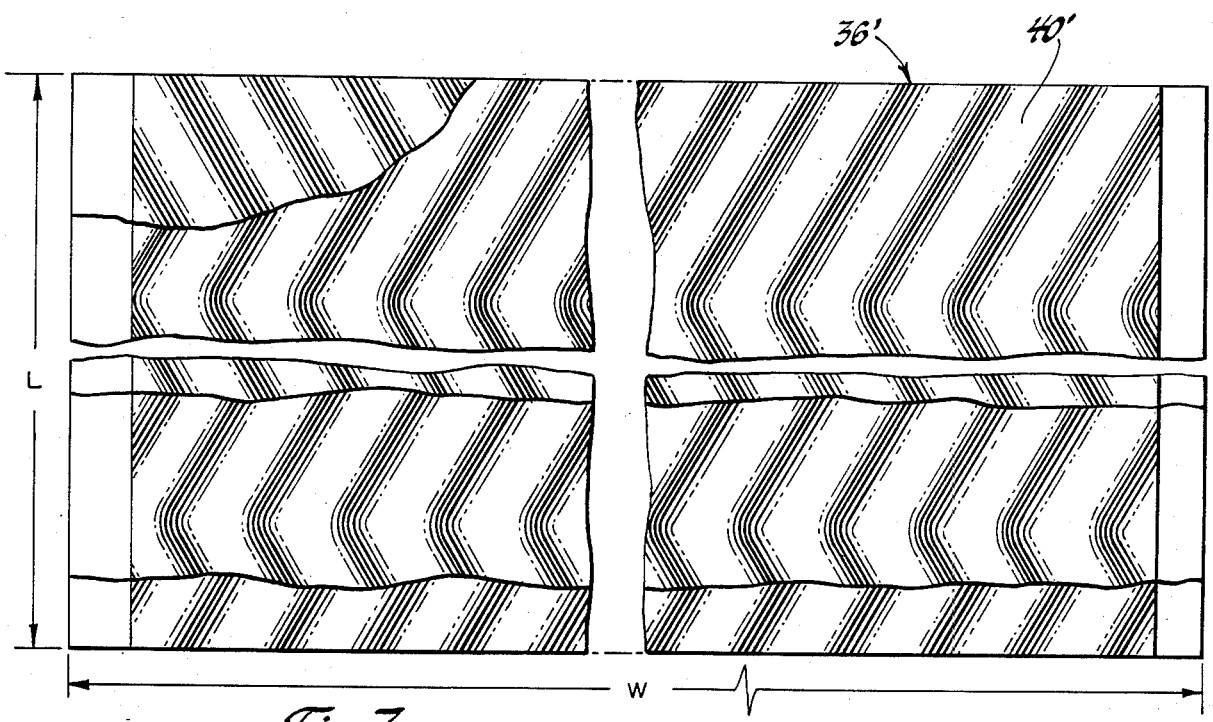
FIG. 7 is a plan view but with parts broken away taken along the line 7—7 in FIG. 6.

The retainer 20 comprises a pair of identical sheet metal shells 34 as best seen in FIGS. 2, 4 and 8 while the monolith or substrate 22 which is retained thereby as disclosed in more detail later, is constructed of metal foil modules 36. As best seen in FIG. 5, the modules 36 are individually formed of folded and interleaved sheets 38 and 40 of smooth and corrugated metal foil respectively. The two sheets 38 and 40 have a single fold 42 and 44 respectively permitting their interleaving in a manner so that the halves 46 of the smooth foil sheet alternate with the halves 48 of the corrugated foil sheet to form a row of straight-through passages 50 between the adjacent foil layers (i.e. two rows). Alternatively, the modules can be constructed in the form 36' shown in FIGS. 6 and 7 by simply individually forming them of a single sheet 40' of corrugated metal foil having a zigzag or herringbone pattern such as disclosed in U.S. Pat. No. 4,318,888 assigned to the assignee of the present invention and which is hereby incorporated by reference. This permits folding of the sheet 40' directly on itself without nesting to form two rows of passages 50' with the same module thickness (T) as the FIG. 5 module. Moreover, in the FIG. 6 module construction, the herringbone pattern of corrugations provides the passages 50' with multiple turns whose number and angular direction can be varied for better heat and mass transfer behavior with low pressure drop (i.e. better converter efficiency).

Preferably, the foil used in the construction of the modules 36 and 36' is wisker-covered metal foil which has been found to be ideally suited to retain a catalyst coating as disclosed in the afore-mentioned U.S. Pat. Nos. 4,318,828 and 4,331,631 assigned to the assignee of the present invention and which are hereby incorporated by reference.

Figure 10:
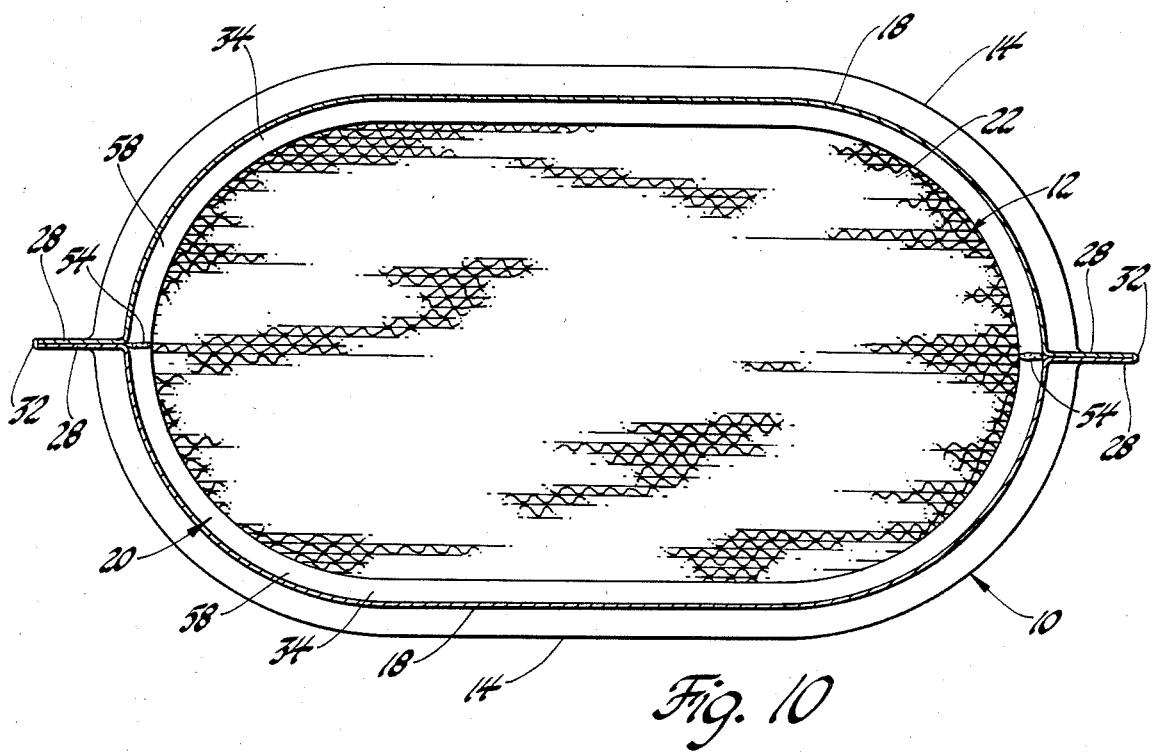
FIG. 10 is an enlarged cross-sectional view taken along the line 10—10 in FIG. 1.
Figure 11:
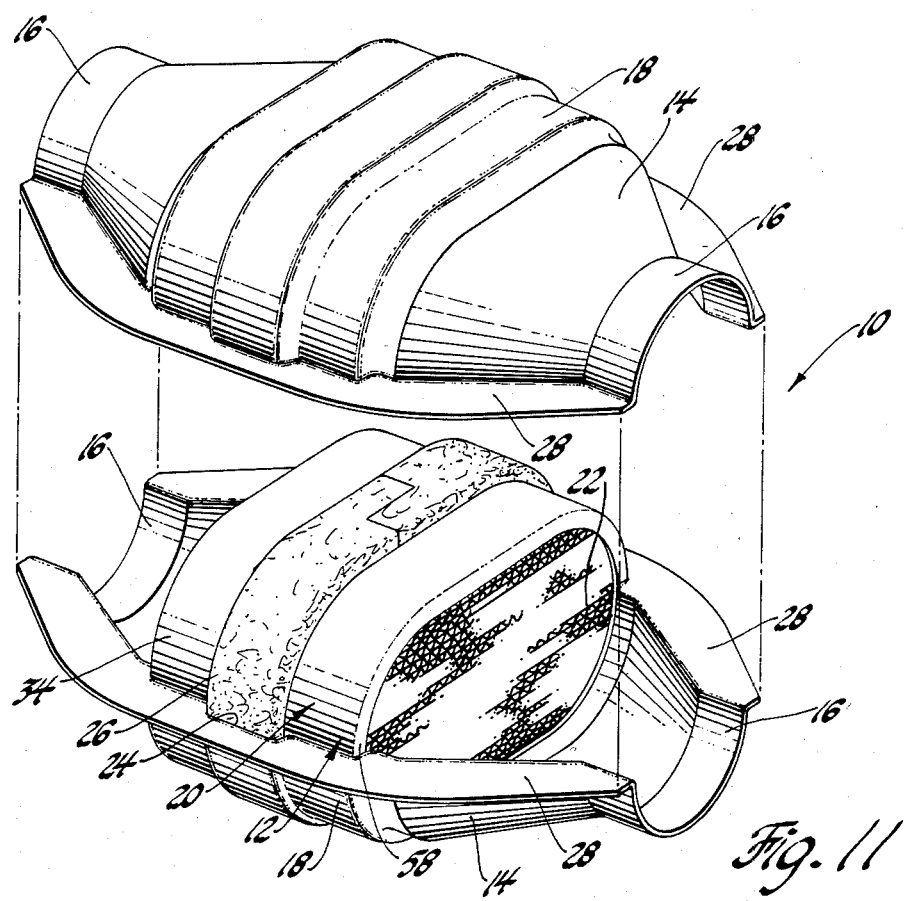
FIG. 11 is a perspective view of the converter in FIG. 1 with the top housing shell exploded.

The modules 36 or 36' are provided with a uniform thickness (T) and length (L) but various widths (W) so as to be stackable on each other as best seen in FIG. 8 and conformable to the outline or profile of the desired substrate cross-section as seen in FIG. 10. The two retainer shells 34 provided for the stacked modules conjointly exactly conform about their interior to the desired substrate cross-sectional profile whereas the free or unloaded stack height of the modules 36 or 36' is made oversize so that a predetermined compressive load is applied to the modules crosswise thereof by clamping action of the retainer shells when they are forced to engage each other on opposite sides along mating longitudinal edges 52 which then are permanently joined by seam welds 54. With such joining of the retainer shells, the stacked modules 36 or 36' are thereafter frictionally held together with the thus retained compressive load which is determined so as to prevent relative sliding movement of the substrate foil layers under the harshest conditions expected to be experienced in the exhaust system. And thus there is no need for any form of mechanical strengthening or bonding of the metal foil substrate layers.

For example, in an actual construction of the converter shown having the modules 36 with a thickness (T) of about 2.36 mm using 1.12 mm corrugated stock and 0.051 flat or smooth stock and wherein the oval cross-sectional shape had a major axis length of about 147 mm, a minor axis length of about 76 mm and a length (L) in one case of about 90 mm and in another case of about 114 mm, it was determined that a compressive load of about 1500-2000 pounds proved satisfactory (i.e. did not crush the passages or exceed the modules of elasticity of the foil while maintaining desired retention under the harshest conditions). This result was produced with the stack of modules listed in the substrate layout chart below having reference to FIG. 8 and alphabetical designation of the modules as indicated:

| SUBSTRATE LAYOUT CHART | |
| --- | --- |
| MODULE | WIDTH (W in mm) |
| A A' | 70.8 |
| B B' | 96.9 |
| C C' | 107.4 |
| D D' | 114.8 |
| E E' | 120.9 |
| F F' | 126.1 |
| G G' | 130.0 |
| H H' | 133.6 |
| I I' | 136.8 |
| J J' | 139.4 |
| K K' | 144.8 |
| L L' | 143.2 |
| M M' | 144.8 |
| N N' | 145.8 |
| O O' | 146.5 |
| P P' | 147.0 |
| Q Q' | 147.0 |
| R | 147.2 |

Figure 9:
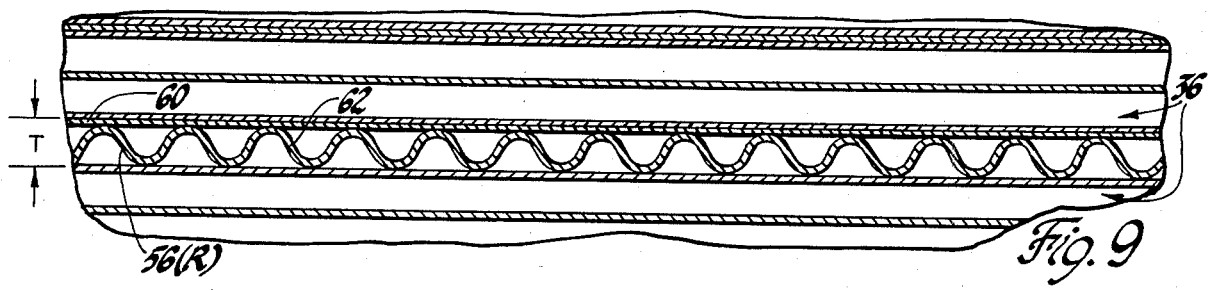
FIG. 9 is an enlarged sectional view taken along the line 9—9 in FIG. 8.

As seen in the above chart, this was accomplished primarily with pairings of equal width (A-O, A'-O')

located on opposite sides of the major axis while two pairs of identical width modules P, P' and Q, Q' were used either side of a central relatively non-complaint corrugated spacer module 56(R) to gain the necessary oversize which in this case was determined to be about 5 mm or about 7%. For spacer purposes the module R as best seen in FIG. 9, was formed of 0.051 mm flat sheet 60 and 1.12 mm transverse corrugated sheet 62 producing a module thickness (T) of 1.17 mm. However, it will be understood that such spacer is not necessary to practicing the invention in that the thickness of the modules 36 and 36' can be varied to meet the desired oversize. Then as further prevention against relative movement of the substrate layers as well as to positively prevent movement thereof relative to the retainer, the retainer shells are provided with an inwardly projecting flange 58 at their opposite ends which extends over the corners of the stacked modules.

Thus it will be appreciated that the retainer and monolith assembly using the wisker-covered foil may be completely assembled and thereafter needs only to be coated with a suitable catalyst as a final step before being mounted in the converter housing. Moreover, while in the preferred construction shown the retainer and monolith assembly serves as a subassembly or insert that mounts in a clam shell type housing, it is also contemplated that the retainer itself could serve as the converter housing with suitable inlet and outlet sections then secured to the opposite ends thereof so as to adapt the retainer and monolith assembly for installation in an exhaust system. Furthermore, it will be appreciated while the catalytic converter shown has an oval cross-sectional profile, the present invention readily lends itself to the formation of other cross-sectional forms having a curved profile. For example, using the above stacking arrangement with either of the module embodiments 36 or 36' and by simply varying the width (W) and/or thickness (T) of the modules and/or their number, it can be seen that a substrate having an irregular as well as a circular cross-sectional profile can be readily constructed. It will also be appreciated that with the pairings of the modules there is a commonality of parts which further simplifies the manufacture and assembly of the retainer and substrate assembly.

The above preferred embodiments are thus illustrative of the invention which may be modified within the scope of the appended claims.

The embodiments of the invention in which an exclusive property or privilege is claimed are defined as follows:

1. A metal foil substrate and retainer for a catalytic converter characterized by a stack of unjoined modules individually formed of a single folded smooth sheet of metal foil and a single folded corrugated sheet of metal foil interleaved in alternate and contacting layers so as to define passages therebetween and wherein each said sheet has a fold along one side and unjoined edges along an opposite side extending longitudinally of the converter along opposite sides thereof with said folded side and unfolded side terminating in end corners and wherein one unjoined edge of each said smooth sheet is located in the fold of the corrugated sheet interleaved therewith and wherein one unjoined edge of each said corrugated sheet is located in the fold of the smooth sheet interleaved therewith, said modules having a uniform thickness but various widths so as to conform said stack to a predetermined cross-sectional curved profile but with the combined thickness of said modules being oversize and compressively loadable to completely conform to said predetermined profile whereby said contacting layers are frictionally held together against relative sliding, and retainer means for forcibly encompassing and thereby compressively loading and retaining said stack in said predetermined profile without penetration or joining thereof and also extending inwardly over the corners of the sheets to engage against the ends of their fold and unjoined edges so as to positively prevent longitudinal movement of the sheets relative to the retainer means.

2. A metal foil substrate and retainer as set forth in claim 1 wherein said retainer means comprises a pair of shells with affixed longitudinally extending abutting edges along opposite sides thereof and inwardly extending flanges at opposite ends thereof.

* * * * *